Figure 1:
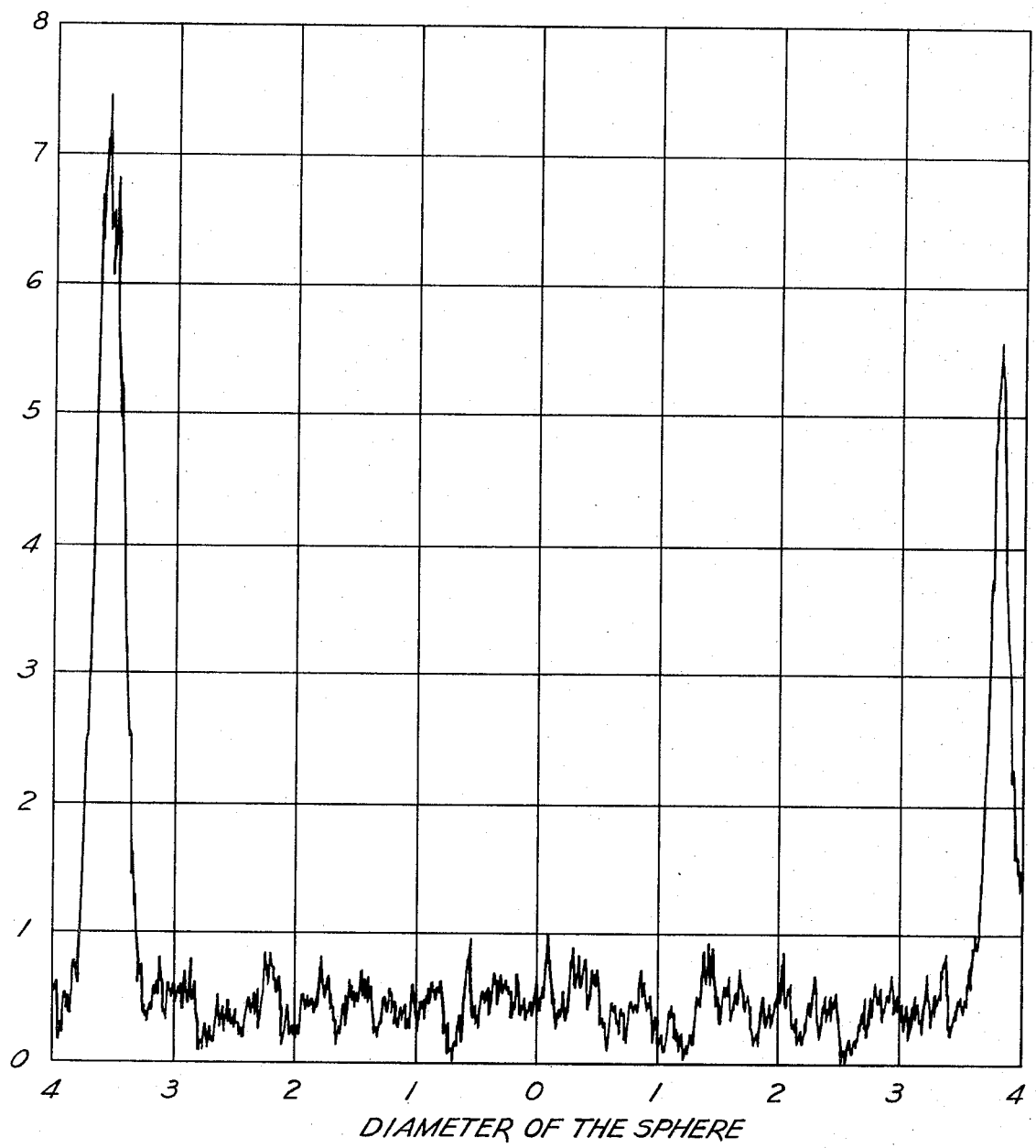

United States Patent [19]
Kobylinski et al.

[11] 3,840,389
[45] Oct. 8, 1974

[54] PROCESS FOR COATING REFRACTORY OXIDES

[75] Inventors: Thaddeus P. Kobylinski, Cheswick; Brian W. Taylor, Gibsonia, both of Pa.

[73] Assignee: Gulf Research & Development Company, Pittsburgh, Pa.

[22] Filed: July 5, 1972

[21] Appl. No.: 269,235

[52] U.S. Cl.............. 117/62, 117/98, 117/169 R, 252/439, 252/455 R, 252/466 PT, 252/472, 423/213.5, 423/561
[51] Int. Cl...... B44d 1/44, B01j 11/12, B01j 11/46, B01j 11/74
[58] Field of Search.............. 117/62, 169 R, 98; 252/439, 472, 455 R, 466 PT; 423/213.5, 561

[56] References Cited
UNITED STATES PATENTS

| | | |
|---|---|---|
| 3,228,892 | 1/1966 | Cole et al. ............ 117/62 |
| 3,275,567 | 9/1966 | Keith et al. ............ 252/472 |
| 3,331,787 | 7/1967 | Keith et al. ............ 252/439 |
| 3,431,220 | 3/1969 | Batzold ............ 252/472 |
| 3,439,061 | 4/1969 | Henderson et al. ............ 252/439 |
| 3,530,194 | 9/1970 | Quik et al. ............ 252/439 |
| 3,542,694 | 11/1970 | Schwettmann............ 252/439 |
| 3,686,137 | 8/1972 | Gatti............ 252/439 |
| 3,716,605 | 2/1973 | Grimes et al. ............ 252/439 |
| 3,784,675 | 1/1974 | Kobylinski et al. ............ 423/213.5 |

Primary Examiner—Michael Sofocleous

[57] ABSTRACT

A process for coating a refractory oxide which involves impregnating a refractory oxide support with a solution of a salt of ruthenium or rhodium alone or in combination with a salt of at least one of platinum, palladium, osmium or iridium while maintaining a highly acid solution having a pH, for example, of about 0.7 to about 2.2 and then contacting the impregnated refractory oxide with $H_2S$ to precipitate the metal sulfide on the refractory support and the product resulting therefrom.

17 Claims, 7 Drawing Figures

DIAMETER OF THE SPHERE

PROCESS FOR COATING REFRACTORY OXIDES

This invention relates to a process for coating the outer and interior surfaces of a refractory oxide with a metal sulfide selected from the group consisting of the sulfides of ruthenium and/or rhodium and the sulfides of ruthenium and/or rhodium in combination with one or more of the sulfides of platinum, palladium, osmium or iridium and the product resulting therefrom.

The noble metals, platinum, palladium, ruthenium, rhodium, osmium and ruthenium, can be used, under reducing conditions, to treat exhaust gases from an internal combustion engine to reduce the nitrogen oxide content thereof or, under oxidizing conditions, to convert the carbon monoxide or unburned hydrocarbons therein to carbon dioxide or water. The noble metals so used can be mounted on a porous refractory oxide support. This can be done by impregnating the refractory oxide support with a solution of a salt of the noble metal and then calcining the impregnated refractory oxide support. It is desirable to coat not only the outer surfaces but also the inner surfaces of the refractory oxide support and to obtain a substantially uniform distribution throughout the bulk thereof. One advantage of a refractory oxide so prepared is that the metal is relatively free of attrition, because most of the metal is within the pores of the refractory oxide where it is not subject to mechanical contact with particulate materials that are present in the exhaust gas. By spreading a unit amount of metal throughout the bulk of the refractory oxide rather than concentrating it on the surface thereof the surface area of the metal is increased substantially and, therefore, its activity. Additionally, the metal within the bulk of the refractory oxide is less volatile than that on the surface and will be more easily retained within the catalyst.

We have observed that when a refractory oxide is impregnated with platinum, palladium, osmium or iridium, as disclosed above, and then calcined, said metals are uniformly distributed throughout the bulk of the refractory oxide. We have also observed, however, that if the refractory oxide is impregnated with ruthenium and/or rhodium, or ruthenium and/or rhodium in combination with one or more of platinum, palladium, osmium or iridium, as disclosed above, and then calcined, the metals are not uniformly distributed throughout the bulk of the refractory oxide but are mainly concentrated on the surface thereof as large, discontinuous masses of metal in the form of crystallites. In such cases, the surface area of the metal available to serve as catalyst is very small and the metal can easily be removed from the surface thereof by attrition.

We have found that a refractory oxide support carrying ruthenium and/or rhodium, or ruthenium and/or rhodium in combination with one or more of platinum, palladium, osmium, or iridium uniformly distributed therethrough can be prepared by impregnating a refractory oxide support with a solution of a salt or a combination of salts of said metals while maintaining the pH of said solution between about 0.7 to about 2.2, preferably in the range of about 1.0 to about 1.5, and then contacting the impregnated refractory oxide support with $H_2S$ to precipitate the corresponding metal sulfide throughout.

The support used herein can be any one of the refractory oxide supports well-known in the art, such as those prepared from alumina, silica, magnesia, thoria, titania, zirconia, silica-aluminas, silica-zirconias, magnesia-aluminas, etc. In addition, the support can be activated carbon, pumice, etc. Other suitable supports include the naturally-occurring clays, such as diatomaceous earth. In general, the surface area of these supports can be from about $10m^2$ to about $500m^2$ per gram, preferably from about $50m^2$ to about $300m^2$ to about $300m^2$ per gram. Additional desirable supports for use herein are the more-recently developed corrugated ceramic materials made, for example, from alumina, silica and magnesia, lithium, etc. An example of such ceramic material is Therma Comb made by American Lava Corporation, Chattanooga, Tennessee, which is more fully described in U.S. Pat. No. 3,444,925. Preferably, the ceramic material is first coated with, for example, from about five to about 20 weight per cent thereof of a refractory oxide, such as defined above, prior to impregnation as defined herein.

The preparation of the impregnated refractory oxide herein is easily effected by contacting the refractory oxide with a solution, aqueous or alcoholic, containing a dissolved salt of ruthenium, rhodium or a combination of either or both salts with one or more dissolved salts of platinum, palladium, osmium or iridium. Suitable salts of the metals include the chlorides, nitrates, oxychlorides tetraoxides, amine-chlorides, sulfates, ammonium chlorides, nitroso chlorides, nitroso nitrates or other soluble salts or complexes thereof. When an alcoholic solution is used any suitable alcohol, such as methanol, ethanol, propanol, etc., is satisfactory. The amount of dissolved salt used can vary over a wide range as long as the final refractory oxide product carries from about 0.005 to about 5.0 per cent, preferably from about 0.01 to about 1.0 per cent by weight of each metal. The pH of the solution used in such treatment is critical and must be highly acidic, that is, maintained in the range of about 0.7 to about 2.2, preferably in the range of about 1.0 to about 1.5, during treatment in order to obtain the desired penetration into the bulk of the refractory oxide support and obtain uniform distribution therethrough. The pH of the solution can be maintained highly acidic within the defined limits during the treatment in any suitable manner, for example, with a mineral acid, such as HCl, $HNO_3$, $H_2SO_4$, HF, an organic acid, such as acetic acid, etc. Suitable impregnation of the refractory oxide with the above solution can be obtained over a period of about 15 minutes to about six hours, or even more in the case wherein the bulk of the refractory oxides demands, but, in general, a contact period of about 20 to about 60 minutes will suffice. The temperature of treatment can be in the range of about 15° to about 95° C., preferably from about 20° to about 60° C. Pressure is not critical and elevated pressures, for example, 100 pounds per square inch gauge or even higher can be used, but generally atmospheric pressure will suffice.

The impregnated refractory oxide is then treated with $H_2S$ to precipitate the corresponding metal sulfide in place without migration. The amount of $H_2S$ needed is that amount stoichiometrically required to react with the metal and form the sulfide thereof, although from about five to about 100 or more molar excess can be used to assure such reaction and deposition. The reaction conditions of time, temperature and pressure of such treatment are similar to those employed in the defined impregnation.

If the refractory oxide after treatment with $H_2S$ is wet with water or alcohol, it can be dried, for example, at

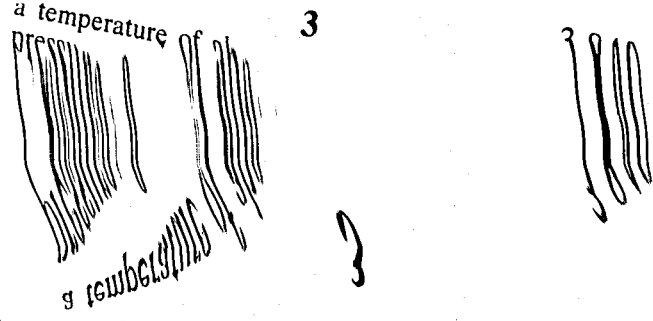

That both control of pH of the treating solution during impregnation and H₂S treatment are essential for substantially uniform distribution of metal throughout a refractory oxide body can be seen from the following. An additional series of runs was carried out using alumina spheres having a diameter of one-sixteenth of an inch and of the same characteristics as the alumina in coating the ceramic structure used in the above experiments. The alumina spheres were calcined at 1200° F. for 12 hours prior to use herein. In a first experiment, Experiment No. 22, the alumina spheres were impregnated in an aqueous solution of ruthenium chloride. No pH adjustment was made at any time during the treatment. The pH during treatment remained at around 4.0. The amount of ruthenium in solution was such that the alumina product obtained contained 0.3 weight per cent ruthenium. After an impregnation period of two hours at atmospheric pressure and ambient temperature, excess solution was drained from the alumina and dry $H_2S$, at a rate of 100 cc per minute and atmospheric pressure and ambient temperature was passed through the alumina. The catalyst was then dried at about 105° C. for 12 hours and calcined in air at about 500° C. for 12 hours. In a second experiment, Experiment No. 23, the same procedure defined above was used, except that the pH of the treating solution was maintained at about pH of 2.0 by the addition thereto of 0.5N HCl. In a third experiment, Experiment No. 24, the second experiment was repeated except that the pH was maintained at about 1.0 during impregnation.

The catalysts from each of the three experiments were split down the middle and observed visually. In the first a black coloring, indicating ruthenium, was observed on the surface of the sphere, while the interior thereof was white. A black coloring was noted on the outside shell of the alumina spheres from the second experiment and the interior thereof was light gray. The alumina spheres from the third experiment had a uniform gray color throughout, indicating a dispersion of metal throughout the bulk of the alumina.

The samples from the three experiments were also submitted to a microprobe analysis for ruthenium and sulfur distribution therethrough. Each selected spherical particle, split through the middle, was scanned along the intersection diameter. The apparatus used consisted of a JSM-U3 scanning electro-microscope equipped with JEOL microprobe attachment. Parameters of each measurement were as follows: voltage 25 KV, current $1 \times 10^{-7}$ amp, X-ray intensity 30 counts per second full scale on the chart. X-ray spectra lines used were as follows: K for sulfur and L for ruthenium. Results of analysis are presented in FIGS. 1 through 7 wherein concentrations of either sulfur or ruthenium is plotted as a function of particle diameter. Diameter of each particle was arbitrarily divided into eight sections with 0 indicating the center of the sphere and 4 the outer diameter thereof. Each unit on the ordinate represents a distance of 112.5 microns. Concentrations of each element is expressed on the abscissa in arbitrary numbers where 0 on the scale corresponds to zero amount of the element in the catalyst particle.

FIG. 1 represents an alumina particle wherein impregnation was effected without pH adjustment. Note ruthenium is concentrated on the outer shell of the particle with little or no metal in the interior. Although in FIG. 1 the maximum ruthenium concentration does not coincide exactly with the outer edge of the particle and is shifted to the outside, this is due to the time lag between the signal from the instrument and the response of the pen in the recorder.

Figure 2:
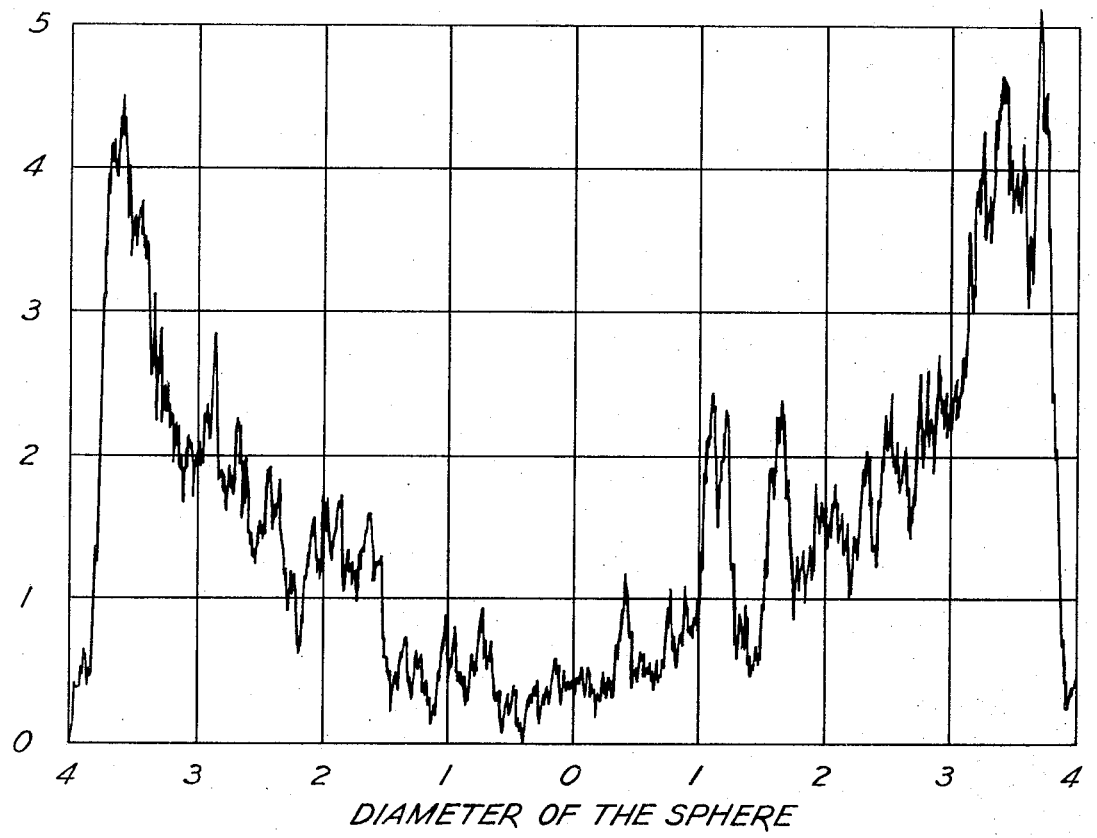

FIG. 2 represents results obtained using a solution having a pH of 2.0. Note that the distribution of ruthenium in this case is better than that obtained in FIG. 1. Although the highest concentration of ruthenium is still on the alumina surface, penetration of metal into the bulk has improved.

Figure 3:
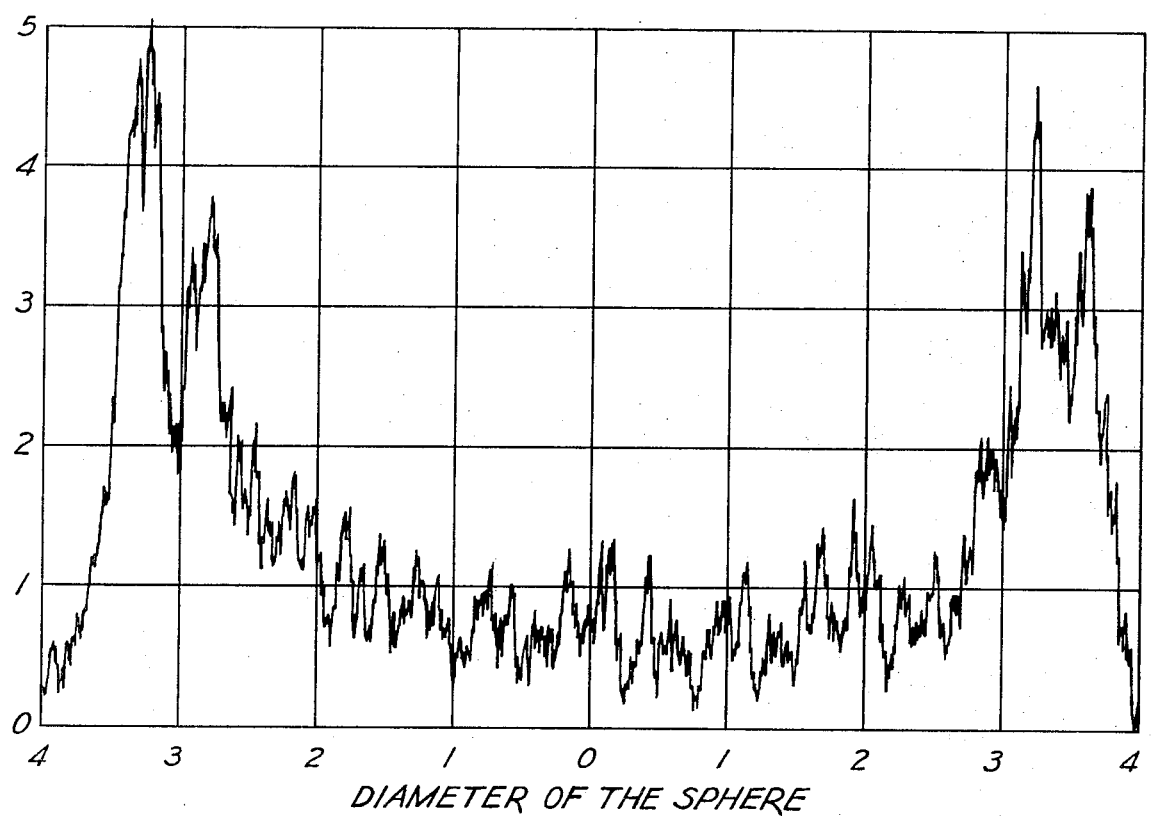

FIG. 3 is a representative of the alumina sphere of FIG. 2 but wherein analysis for sulfur was made. The profile of sulfur concentration corresponds to the profile of ruthenium concentration in FIG. 2.

Figure 4:
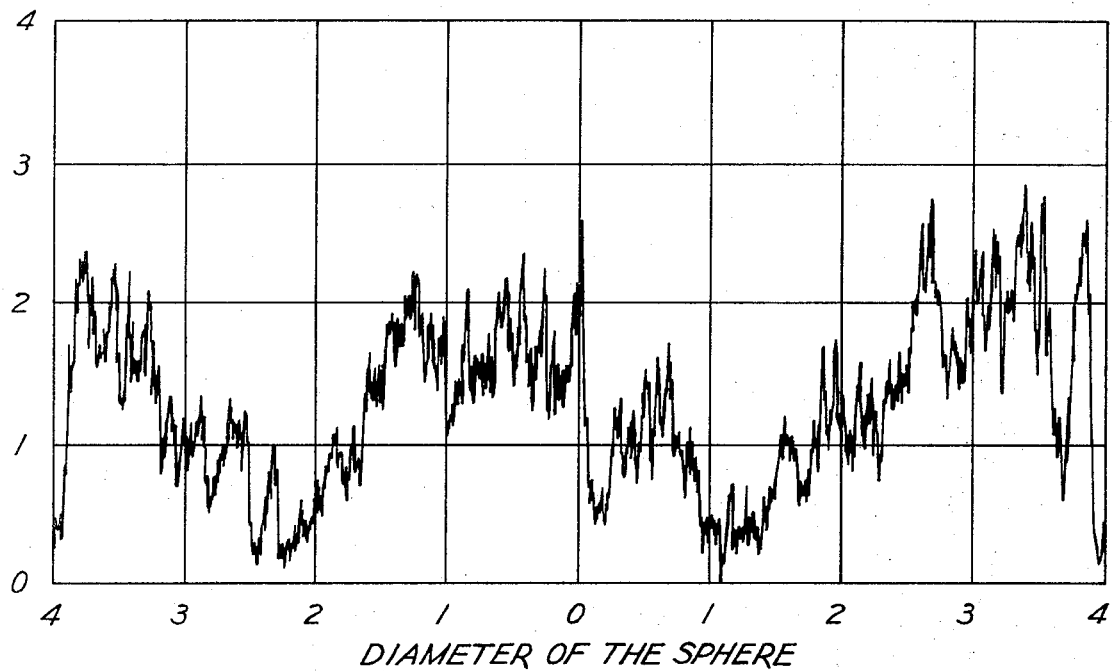
Figure 5:
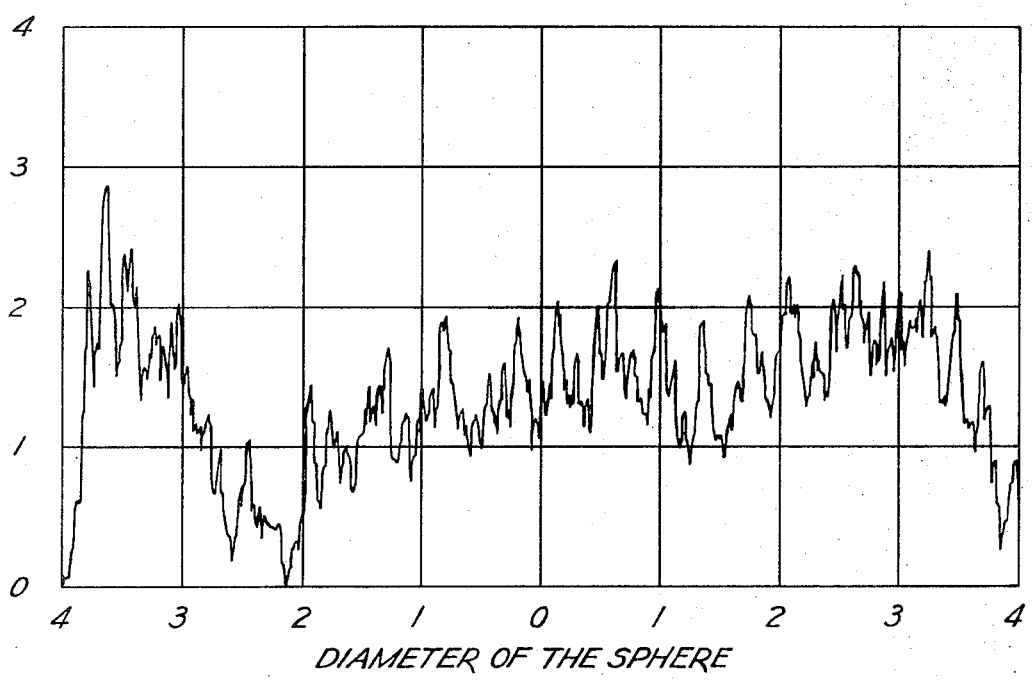
Figure 6:
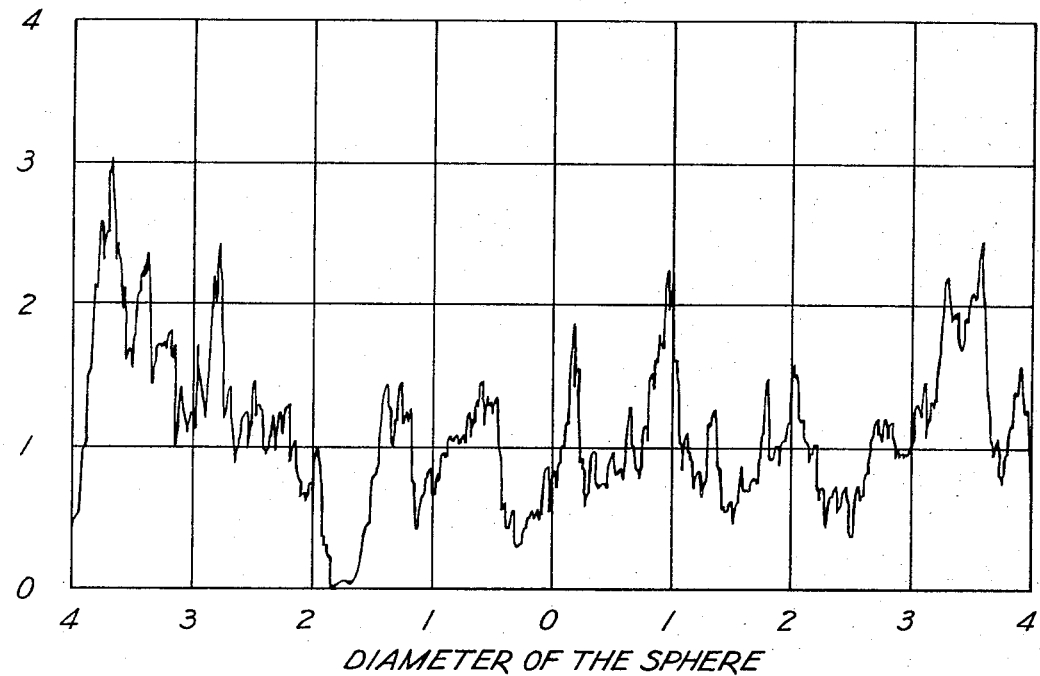
Figure 7:
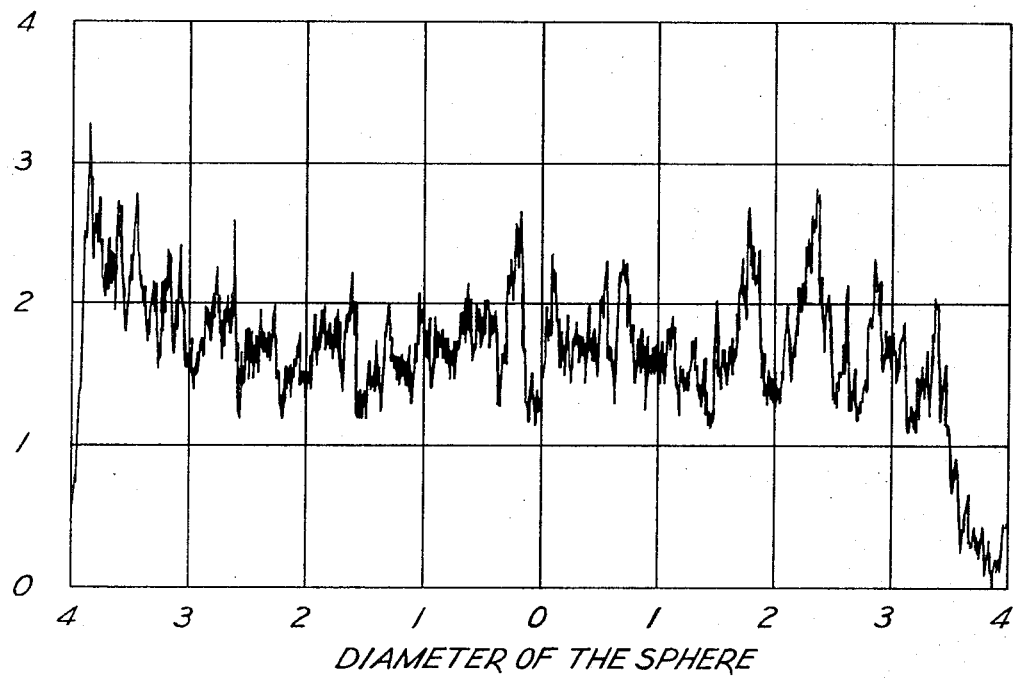

Three separate catalyst particles were selected from the procedure wherein impregnation was carried out using a solution having a pH of 1.0. Concentration profiles for each particle are shown in FIGS. 4 through 7. FIGS. 4, 5 and 6 are specific to the concentration profiles of ruthenium of the three alumina particles. FIG. 7 is specific to the concentration of the sulfur in the sphere referred to in FIG. 5. Note that each of the profiles in FIGS. 4 through 7 show that ruthenium is uniformly dispersed throughout the alumina spheres.

EXPERIMENTS NOS. 25, 26 and 27

Catalysts were prepared exactly as in Experiments Nos. 22, 23 and 24, respectively, except that impregnation was effected with solutions containing rhodium chloride in place of ruthenium chloride and $H_2S$ treatment was omitted. Visual inspection of the split particles revealed that each of the catalysts had nonuniform color therein with light and darker spots across the particle intersection. This indicated that while penetration of metal was satisfactory the coating of metal on the surfaces was not uniform.

EXPERIMENTS NOS. 28, 29 and 30

Catalysts were prepared as in Experiments Nos. 25, 26 and 27, respectively, except that the catalyst particles were subjected to treatment with $H_2S$ before drying and calcining, as in Experiments Nos. 22, 23 and 24. Visual observation of the split particles revealed a completely uniform color throughout the bulk thereof.

EXPERIMENTS NOS. 31, 32, 33 and 34

Additional experiments were conducted as in Experiments Nos. 28, 29 and 30 but wherein the catalyst particles were impregnated with solutions of ruthenium chloride and chloroplatinic acid (Experiment No. 31), palladium chloride and chloroplatinic acid (Experiment No. 32), rhodium chloride and ruthenium chloride (Experiment No. 33) and ruthenium chloride and iridium chloride (Experiment No. 34), in each case of which the pH of the solution was maintained at 1.0. The final particles were split down the middle and it was noted visually by color in each case that there was a uniform distribution of metals throughout the bulk of the particles.

EXPERIMENTS NOS. 35, 36 and 37

Catalysts having 0.5 weight per cent platinum, palladium or iridium were prepared by impregnation of alumina spheres with platinum chloride (Experiment No. 35), palladium chloride (Experiment No. 36) or iridium chloride (Experiment No. 37), respectively, with no pH adjustment (ambient pH being about 4.0) and without H₂S treatment. Visual observation of the split spheres revealed a uniform distribution of metal throughout the bulk thereof.

Resort may be had to such variations and modifications as fall within the spirit of the invention and the scope of the appended claims.

We claim:

1. A process for coating a refractory oxide having a surface area of about 10m² to about 500m² per gram with at least one metal selected from (1) ruthenium alone, (2) rhodium alone, (3) ruthenium and rhodium alone and (4) ruthenium and/or rhodium in combination with at least one of platinum, palladium, osmium or iridium which comprises impregnating said refractory oxide with a solution containing a salt of at least one of said metals while maintaining the pH between about 0.7 to about 2.2 to obtain penetration of said solution into the bulk of said refractory oxide thereby substantially forming a uniform coating of the outer and the interior surfaces of said refractory oxide, thereafter contacting said treated refractory oxide with H₂S at a temperature of about 15° to about 95° C. to precipitate the corresponding metal sulfide throughout said refractory oxide and drying said refractory oxide containing the metal sulfide coating.

2. The process of claim 1 wherein said refractory oxide is carried on a ceramic base.

3. The process of claim 1 wherein the pH of said solution is within the range of about 1.0 to about 1.5.

4. The process of claim 1 wherein said refractory oxide is an aluminum oxide.

5. The process of claim 1 wherein said impregnation is effected within a temperature range of about 15° to about 95° C.

6. The process of claim 1 wherein said impregnation is effected within a temperature range of about 20° to about 60° C.

7. The process of claim 1 wherein said treatment with H₂S is within the range of about 20° to about 60° C.

8. The process of claim 1 wherein the refractory oxide so prepared is dried at a temperature of about 90° to about 160° C.

9. The process of claim 1 wherein the refractory oxide so prepared is dried at a temperature of about 100° to about 140° C.

10. The process of claim 1 wherein the refractory oxide so prepared is calcined at a temperature of about 400° to about 600° C.

11. The process of claim 1 wherein the refractory oxide so prepared is calcined at a temperature of about 450° to about 550° C.

12. The process of claim 1 wherein said metal is ruthenium.

13. The process of claim 1 wherein said metal is rhodium.

14. The process of claim 1 wherein said metals are ruthenium and platinum.

15. The process of claim 1 wherein said metals are ruthenium and palladium.

16. The process of claim 1 wherein said metals are ruthenium and rhodium.

17. The process of claim 1 wherein said metals are ruthenium and iridium.

* * * * *

UNITED STATES PATENT OFFICE
CERTIFICATE OF CORRECTION

Patent No. 3,840,389  Dated October 8, 1974

Inventor(s) Tadeusz P. Kobylinski and Brian W. Taylor

It is certified that error appears in the above-identified patent and that said Letters Patent are hereby corrected as shown below:

Column 4, line 65, first instance, "with" should be without"

Column 5, line 51, "K" and "L" should read "$K^a$" and "$L^a$", respectively.

Signed and sealed this 17th day of December 1974.

(SEAL)
Attest:

McCOY M. GIBSON JR.
Attesting Officer

C. MARSHALL DANN
Commissioner of Patents